Sept. 25, 1923.
K. FRITSCH
SECTION INSULATOR
Filed Feb. 20, 1923
1,469,078
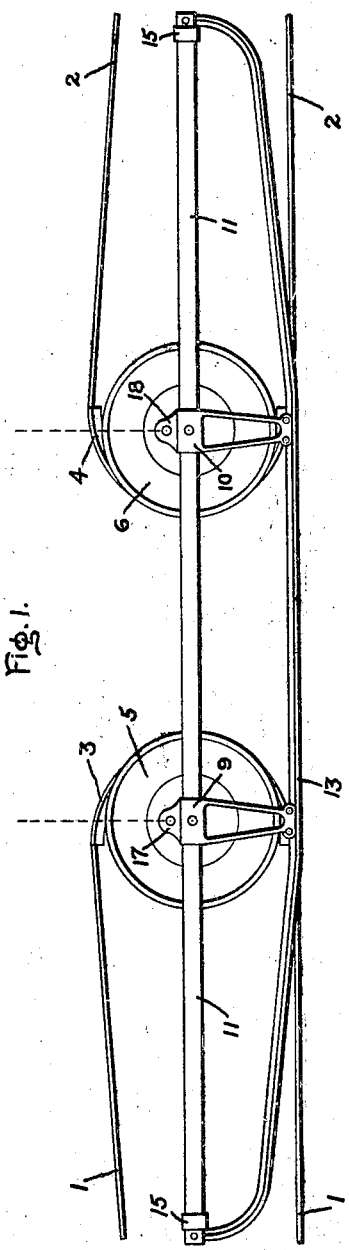
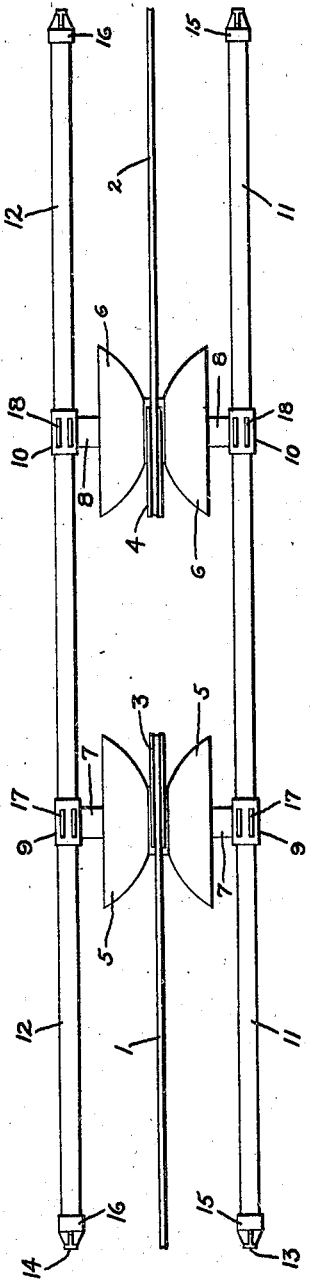
Inventor:
Karl Fritsch.
by [signature]
His Attorney Patented Sept. 25, 1923.

1,469,078

UNITED STATES PATENT OFFICE.

KARL FRITSCH, OF MURNAU, GERMANY, ASSIGNOR TO GENERAL ELECTRIC COMPANY, A CORPORATION OF NEW YORK.

SECTION INSULATOR.

Application filed February 20, 1923. Serial No. 620,275.

*To all whom it may concern:*

Be it known that I, KARL FRITSCH, a citizen of the German Republic, residing at Murnau, Oberbayern, Germany, have invented certain new and useful Improvements in Section Insulators, of which the following is a specification.

The present invention relates to electric railways and more especially to the overhead trolley wire construction thereof.

In order to provide for sectionalizing a trolley system so that workmen may make repairs in safety on any one section while the rest of the system remains electrically charged and in operative condition, it is customary to provide section insulators at desired points in the trolley wire and independently connect the section of wire between any two insulators to a feeder cable so that when it becomes necessary to render a particular section dead, it is necessary only to open its connection to the feeder cable.

The object of my invention is to provide an improved section insulator which shall be light and neat in appearance, strong and highly insulative and which will enable the current collector to pass freely and smoothly therebeneath.

One embodiment of the invention is illustrated in the accompanying drawing, in which:

Fig. 1 is a side elevation, and Fig. 2 is a plan of a section insulator for use on systems employing bow trolleys.

The trolley wires 1 and 2 are looped about arcuate stirrups 3 and 4 supported by spool insulators 5 and 6. These insulators are mounted on horizontal bars 7 and 8 carried by brackets 9 and 10 having their upper ends sleeved and riveted upon longitudinal beams 11 and 12 in the form of steel pipes. The lower ends of the brackets 9 and 10 are attached to runner tracks 13 and 14 which are made rocker-shaped by extending their ends a considerable distance beyond the brackets and bowing them upwardly to connect with extended ends of the beams 11 and 12 by means of cast terminals 15 and 16. The brackets 9 and 10 have lugs 17 and 18 at their upper ends for attachment of the suspension wires.

When a bow trolley approaches the section insulator, it will remain in conductive relation to the trolley wire 1 or 2 until it arrives at a point nearly beneath the first of the brackets 9 or 10 where it passes without disturbance to the tracks 13 and 14 and the wire extends upwardly and about the arcuate stirrup. The trolley slides inactive along the tracks 13 and 14 until it passes off therefrom upon the opposite trolley wire and receives current from the latter section.

While I have shown and described the best form of the invention known to me, I do not desire to be restricted thereto.

What I claim as new and desire to secure by Letters Patent of the United States, is:—

1. A section insulator comprising two side beams, runner tracks supported beneath said beams, and two insulators held in spaced relation between said beams and adapted to receive about them the respective ends of the trolley wire.

2. A section insulator comprising two side beams, bowed runner tracks supported beneath said beams, crossbars connecting said beams, and insulators mounted on said crossbars and adapted to receive the respective ends of the trolley wire.

3. A section insulator comprising two side beams, bowed runner tracks connected at their ends to the ends of said beams, brackets connecting said tracks with said beams at points intermediate their ends, crossbars connecting opposite brackets, and insulators mounted on said crossbars and adapted to receive the respective ends of the trolley wire.

4. A section insulator comprising two side beams, runner tracks beneath said beams, two spool insulators arranged between said beams, and stirrups mounted on said insulators for the reception of the respective ends of the trolley wire.

In witness whereof, I have hereunto set my hand this eleventh day of January, 1923.

KARL FRITSCH.